No. 710,844. Patented Oct. 7, 1902.
J. S. COPELAND.
DRIVE AND BRAKE MECHANISM FOR VELOCIPEDES.
(Application filed Feb. 4, 1901.)
(No Model.)
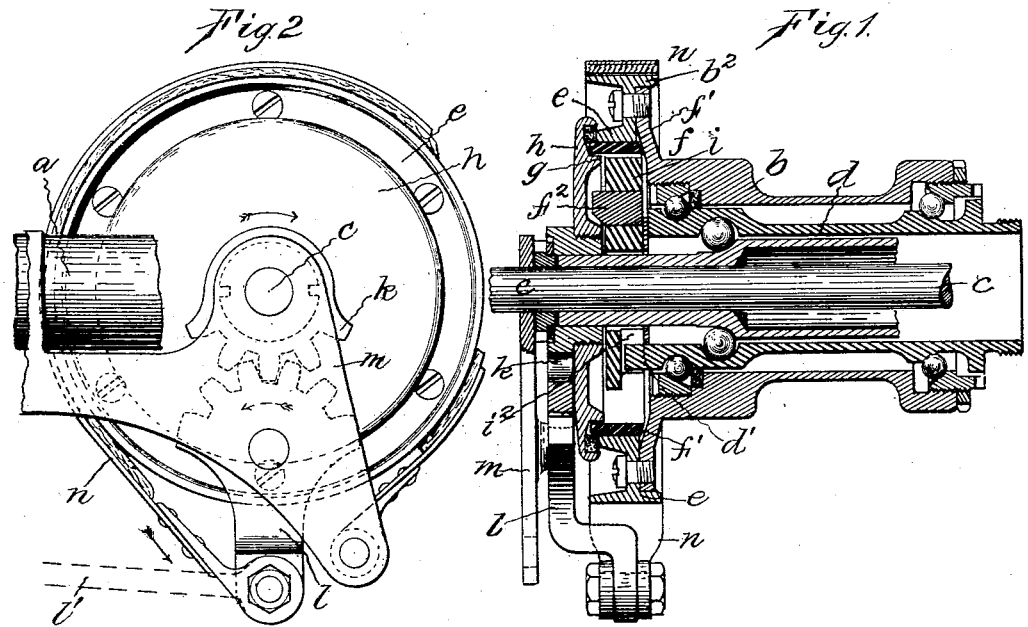
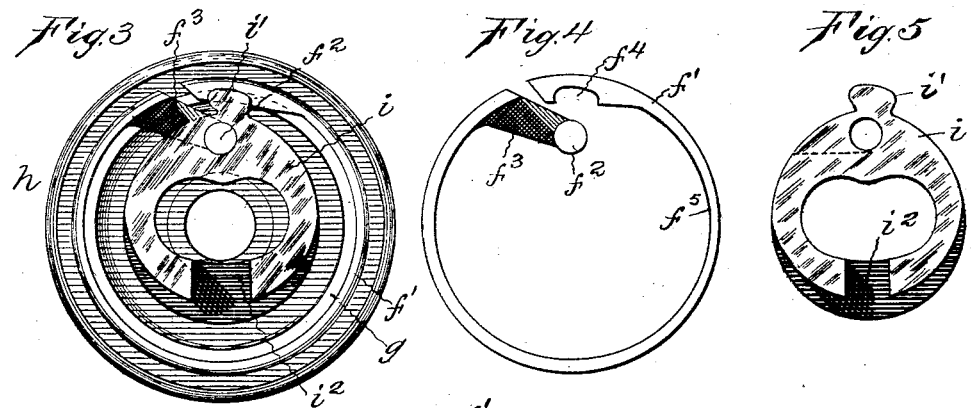
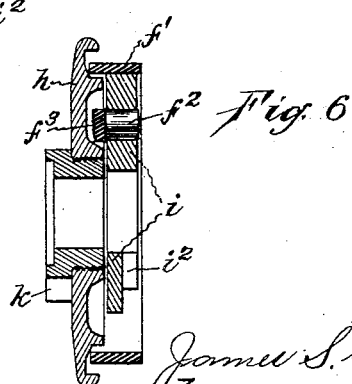
Witnesses:
W. H. Barker.
Arthur B. Jenkins.
Inventor:
James S. Copeland
by Chas. L. Burdett,
attorneys.
THE NORRIS PETERS CO., PHOTO-LITHO., WASHINGTON, D. C.

UNITED STATES PATENT OFFICE.

JAMES S. COPELAND, OF HARTFORD, CONNECTICUT, ASSIGNOR TO AMERICAN BICYCLE COMPANY, OF JERSEY CITY, NEW JERSEY, AND NEW YORK, N. Y., A CORPORATION OF NEW JERSEY.

DRIVE AND BRAKE MECHANISM FOR VELOCIPEDES.

SPECIFICATION forming part of Letters Patent No. 710,844, dated October 7, 1902.

Application filed February 4, 1901. Serial No. 45,991. (No model.)

*To all whom it may concern:*

Be it known that I, JAMES S. COPELAND, a citizen of the United States, and a resident of Hartford, in the county of Hartford and State of Connecticut, have invented certain new and useful Improvements in Coaster-Brake Mechanism for Velocipedes, of which the following is a specification.

My invention relates to the class of devices now in common use as a part of the driving mechanism for a bicycle which may be driven forward, allowed to run or coast under its inertia, or retarded, these several conditions of use being controlled from the crank-shaft.

The object of my invention is to provide a structure of this class in which the several means to this end shall be simple, compact, and effective and contain both the drive and the brake clutch in the one element.

Referring to the drawings which form part hereof, Figure 1 is a view in vertical central section of a wheel-hub, showing one form of embodiment of my invention. Fig. 2 is a detail view, in side elevation, of the hub and part of the vehicle-frame and attached anchor-plate. Fig. 3 is a detail view in elevation of the clutch and its supporting part. Fig. 4 is a detail view of the clutch-ring. Fig. 5 is a detail view of the clutch-lever. Fig. 6 is a detail view in section through the oscillating plate, the gear, and the lever.

My invention is more particularly intended for use as a part of the driving mechanism of a bicycle and is illustrated and described herein as embodied in and connected with the hub of the driving-wheel of a bicycle and its supporting-frame; but it is also adapted for use in connection with other vehicles, and such use is contemplated by me as within the scope of my invention.

In the accompanying drawings the letter $a$ denotes a part of the side fork of the frame of a bicycle, in which the driving-wheel hub $b$ is mounted and rotarily supported on the axle $c$ in any suitable manner.

The driving power to cause the wheel to turn in a forward direction or to check its rotation is applied to the element $d$, which is preferably a sleeve extending within the hub $b$ and bearing on its outer end any suitable form of gear or like means of connection with the driving mechanism.

Suitable bearings of any well-known or convenient form are provided between the rotating parts, such forming no part of my within invention, and the hub may have any convenient means of attachment for the spokes that may be desired.

On one end of the hub $b$ a clutch-drum $e$ is secured or formed, and a drive-clutch $f$ is arranged to connect the parts, in the form shown the connecting element consisting of a flexible ring $f'$, mounted on and held in position by a flange or shoulder $g$ on the inner face of the oscillating plate $h$, which is mounted to turn about the axle $c$ of the wheel.

The flexible ring $f'$ serves as a part of the driving-clutch when it is expanded so that its outer surface grasps the inner surface of the clutch-drum $e$ and as a part of the brake-clutch when it is contracted upon the shoulder or flange $g$ on the plate $h$. This expanding and contracting movement of the clutch-ring is effected by the lever $i$, so connected to the opposite ends of this ring as to cause the ring to expand when the lever is swung in one direction and to contract when the lever is swung in the opposite direction. One operative form of mounting this lever is to pivot it on the stud $f^2$ on the arm $f^3$, extending inwardly from one end of the ring, and to locate the end $i'$ of the lever in a socket $f^4$ in the other end of the ring, Figs. 3, 4, this stud and socket being located substantially in a radial line drawn from the center of the ring. The lever, as shown, is of peculiar form, the enlarged body portion having an opening through which the axle extends and large enough laterally to allow the lever to swing from one side to the other to an extent sufficient to cause the clutch-ring to take effective hold of the clutching-surfaces it makes contact with. This clutch-lever $i$ is connected to the driving element $d$, as by means of the lug $d'$, which enters the opening $i^2$ in the lower part of the lever, Figs. 1, 3, and 5, and when the parts are turned in the direction of forward movement of the vehicle the lug $d'$ swings the lever $i$ on its pivot and causes the clutch parts to act on the driving-wheel and cause it to turn. As soon as the driving force is relaxed or withdrawn the clutch-ring contracts and the vehicle is left free to coast under its inertia. If the motion of the crank-shaft be reversed, as by back-pedaling on a bicycle, the rotary motion of the driving element $d$ is reversed, the clutch-lever is swung in such direction as to contract the clutch-ring upon the shoulder or like surface on the plate $h$, and the brake is put on.

In the form shown the plate is secured to the hub of a segmental gear $k$, the teeth of which are in mesh with the teeth on a lever $l$, which is pivoted to the anchor-plate or a like fixed part $m$. (See Fig. 2.) A band-brake $n$ encircles a brake-drum $b^2$, formed on or connected to the hub $b$, one end being secured to the anchor-plate $m$ and the other to the lever $l$. When the plate is rotated by the reverse movement of the driving element $d$, the gear $k$ rotates in the direction indicated by the arrow in Fig. 2 and causes the band to grasp the brake-drum with sufficient force to stop the rotation of the driving-wheel of the vehicle.

It is obvious that various forms of brake may be operated by this same mechanism by simply connecting up such brake with the connecting-rod $l'$, (indicated in dotted lines in Fig. 2 as secured to the lever $l$.)

In order that the flexible ring may act promptly to grasp the surface of the drive-clutch part against which the ring is forced in expanding, a thin place is formed, as at $f^5$ in Fig. 4, with the result that the portion of the ring from the thin place to the nearest end moves radially outward quickly under the force applied to the lever, and the clutch parts engage much more promptly than where the ring is of more uniform area in cross-section along its whole length. This forms a minor feature of my invention.

What I claim as my invention, and desire to secure by Letters Patent, is—

1. In a drive and brake mechanism in combination with a driving element and means for operating it, a drive-clutch, a brake-clutch, a brake, operative connections between the brake and brake-clutch, a flexible clutch-ring common to both clutches, and a clutch-lever in operative connection with the opposite ends of the clutch-ring, and with the driving element.

2. In a drive and brake mechanism in combination with a driving element and means for operating it, a drive-clutch, a brake-clutch, a brake, operative connections between the brake and brake-clutch, a flexible clutch-ring common to both clutches, and a lever pivoted to the clutch-ring on one side of the opening in the ring, in engagement with the other end of the ring and connected to the driving element and lying within the ring.

3. In a drive and brake mechanism in combination with a driving element and means for operating it, a drive-clutch, a brake-clutch, a flexible clutch-ring common to both clutches, an oscillating plate supporting the clutch-ring, means for expanding the clutch-ring into engagement with the drive-clutch part and contracting it to grasp the brake-clutch part, a brake and means connecting said oscillating plate with a brake structure.

4. In combination with the hub of a driving-wheel, having a brake-drum, a driving element, a drive-clutch, a brake-clutch, a flexible clutch-ring common to both clutches, an oscillating part supporting the clutch-ring and having a clutching-surface, a clutch-lever connecting the clutch-ring and the driving element, a gear on the oscillating plate, a geared lever with teeth in mesh with those of the gear on the plate, a band-brake supported in operative relation to the drum on the driving-wheel and with one end connected to the geared lever and the other to an anchor-plate, and the anchor-plate.

5. In combination in a drive and brake mechanism, a wheel-hub, a drive-clutch, a brake-clutch, an expanding clutch-ring forming a part of both the clutch mechanisms and having a thin portion near the driving end, and means for expanding and contracting the ring against opposing clutching-surfaces, of the drive and brake clutch, and a brake operatively connected with the brake-clutch.

6. In a drive and brake mechanism, in combination with a driving member and means for operating it, a driven member and a brake member, a split clutch-ring, and a clutch-lever in operative connection with opposite ends of the ring and with the driving member, and a brake operatively connected with said brake member.

7. In a drive and brake mechanism, in combination with a driving element and means for operating it, a drive-clutch, a brake-clutch, a flexible clutch-ring common to both clutches, a lever connected with the clutch-ring and with the driving element, an oscillating plate adapted to be operated by the clutch-ring, and connected with a brake structure, and the brake structure.

JAMES S. COPELAND.

Witnesses:
CHAS. L. BURDETT,
ARTHUR B. JENKINS.